US011498982B1

(12) United States Patent
Tao et al.

(10) Patent No.: US 11,498,982 B1
(45) Date of Patent: Nov. 15, 2022

(54) METHOD FOR CONCENTRATING RUBBER EMULSION AND PRODUCT THEREOF

(71) Applicant: Agricultural Product Processing Research Institute, Chinese Academy of Tropical Agricultural Sciences, Zhanjiang (CN)

(72) Inventors: Jinlong Tao, Zhanjiang (CN); Na Kong, Zhanjiang (CN); Jizhen Zhang, Zhanjiang (CN); Zhifeng Li, Zhanjiang (CN); Jihua Li, Zhanjiang (CN); Zirong Luo, Zhanjiang (CN); Mingzhe Lv, Zhanjiang (CN); Pengfei Zhao, Zhanjiang (CN)

(73) Assignee: AGRICULTURAL PRODUCT PROCESSING RESEARCH INSTITUTE, CHINESE ACADEMY OF TROPICAL AGRICULTURAL SCIENCES, Zhanjiang (CN)

( * ) Notice: Subject to any disclaimer, the term of this patent is extended or adjusted under 35 U.S.C. 154(b) by 0 days.

(21) Appl. No.: 17/552,224

(22) Filed: Dec. 15, 2021

(30) Foreign Application Priority Data

May 26, 2021 (CN) .......................... 202110577238.0

(51) Int. Cl.
| | | |
|---|---|---|
| *C08C 1/07* | (2006.01) | |
| *C08C 1/04* | (2006.01) | |
| *B01J 20/28* | (2006.01) | |
| *B01J 20/26* | (2006.01) | |
| *C08C 1/075* | (2006.01) | |

(52) U.S. Cl.
CPC ............... *C08C 1/075* (2013.01); *B01J 20/26* (2013.01); *B01J 20/28004* (2013.01); *B01J 20/28016* (2013.01); *C08C 1/04* (2013.01); *B01J 2220/68* (2013.01)

(58) Field of Classification Search
CPC ...... C08C 1/075; C08C 1/04; B01J 20/28016; B01J 20/28004; B01J 20/26

USPC .......................................................... 523/335
See application file for complete search history.

(56) References Cited

U.S. PATENT DOCUMENTS

| | | | | |
|---|---|---|---|---|
| 3,184,424 A | * | 5/1965 | Chambers ............... | C08F 36/04 524/523 |
| 5,510,399 A | * | 4/1996 | Sauer ........................ | C08C 1/07 528/487 |
| 8,765,822 B2 | * | 7/2014 | Braun ..................... | A61Q 19/04 514/772.3 |
| 9,243,142 B2 | * | 1/2016 | Dussaud ............... | A61K 8/8152 |
| 2007/0219315 A1 | * | 9/2007 | Braun ..................... | C08L 33/26 524/801 |
| 2012/0157552 A1 | * | 6/2012 | Braun ................... | C08F 220/06 524/547 |
| 2013/0121948 A1 | * | 5/2013 | Dussaud ................. | C08L 83/08 523/463 |

OTHER PUBLICATIONS

Jin Manrong, "Highly water absorption resin and its applications in water treatment", technology of water treatment, Aug. 1987, vol. 13, No. 4.

* cited by examiner

*Primary Examiner* — Michael M. Bernshteyn
(74) *Attorney, Agent, or Firm* — Andrew C. Cheng

(57) ABSTRACT

A method for concentrating rubber emulsion and a product prepared by the method are provided, the method includes: a concentrated latex is obtained by separating a superabsorbent resin added in advance into a rubber emulsion with a solid content of 0.01-70% after stirring and concentrating the resin-added rubber emulsion. The method requires simple equipment and consumes less energy, and the prepared polymer emulsion has a solid content up to 76%; the superabsorbent resin adopted herein is reusable after drying, which therefore effectively reduces the production cost; natural latex concentrated by the method has rather high yields of dry rubber and little wastewater production; products prepared from the concentrated natural latex have excellent mechanical property, aging resistance and adhesive property; and concentrating natural latex according to this method does not require advance agglomeration, which reduces the production procedures and improves the production efficiency significantly.

7 Claims, No Drawings

METHOD FOR CONCENTRATING RUBBER EMULSION AND PRODUCT THEREOF

TECHNICAL FIELD

The disclosure relates to the technical field of rubber emulsion concentration, in particular to a method for concentrating rubber emulsion and a product thereof.

DESCRIPTION OF RELATED ART

Polymer latex mainly includes natural latex and synthetic latex, and polymer latex is widely used for making latex products such as sponges, gloves, toys, hoses and the like, which has broad application in daily life. However, fresh natural latex with solid content 20%-40% directly collected from rubber trees (or *Hevea brasiliensis*), or synthetic latex with solid content 20%-40% from emulsion polymerization cannot be directly used for producing latex products because of the low solid content. Concentrated latex puts an end to the difficult molding of some products due to low solid content, and realizes economical transportation and packaging of latex for users far away from rubber producing areas.

Concentrated natural latex has excellent comprehensive performance in film-forming, processing and post-treatment vulcanization, etc., and products made of concentrated natural latex have excellent resilience, high strength, high tensility and other characteristics, and therefore extensive application. Particularly synthetic latex has no equal performance in producing impregnating products. Centrifugating, creaming, evaporation and electroprobe can be adopted to concentrate the natural latex. Among them, the centrifugation way, characterized by high production efficiency, short production process, high product purity and good quality control, is adopted for concentrating more than 90% of commercially used natural latex, but there are shortcomings of low centrifugal efficiency, low yields of dry rubber, large amount of wastewater and high labor costs. The creaming way has advantages of requiring simple production equipment, low investment and low power consumption while providing latex with high concentration (up to 68%) and little rubber loss in the whey in addition to high mechanical stability; it also has disadvantages including long production cycles, high viscosity and high content of non-latex components in the prepared latex, difficult product quality control, high variability, and besides more cost than that of single centrifugation. Latex produced after evaporation and concentration, has high concentration (solid content up to 80%), good stability and fast vulcanization speed, products made of the latex produced after evaporation and concentration show small shrinkage and good aging resistance; the latex is also suitable for making products with more fillers and glue-coated products with a large amounts of fillers; however, such latex products have disadvantages including high water absorption, low transparency, poor electrical conductivity in addition to slow drying. Latex concentrated with electroprobe has few non-rubber components, high purity and high mechanical stability, but the cost of this electroprobe way is rather high as considerable electricity is consumed.

Recent years have seen a rapid development of synthetic latex used mainly for producing non-pure rubber products while a small amount being used for pure rubber products, such as sponges. Outside of China, synthetic latex has accounted for 70% of the total amount of latex consumption, which is mainly promoted by the shortage of natural latex supply and some special properties synthetic-latex-produced products possess in addition to the fast development of petrochemical industry, etc. At present, the ways for concentrating synthetic latex include evaporation and creaming, of which evaporation plays a dominating role. Generally synthetic latex needs to be agglomerated in advance to increase the size of colloidal particles before concentration, resulting a complicated concentration process; yet concentrating synthetic latex using both evaporation and creaming still faces the above-mentioned technical problems.

In light of the above, it is pressing for those skilled in the art to provide a simple and efficient method for concentrating rubber emulsions.

SUMMARY

The disclosure provides a method for concentrating rubber emulsion and its products to solve the above technical problems, in which the water in the rubber emulsion is absorbed by a superabsorbent resin (i.e., a kind of water-absorbent resin) and then the superabsorbent resin is removed by filtration or centrifugation to obtain a concentrated rubber emulsion with high solid content; advantages of the disclosure may lie in requiring simple production equipment while consuming less energy and cost, and being environmental friendly and providing high yields of dry rubber.

One of the technical solutions of the disclosure provides a method for concentrating rubber emulsion, which includes the following steps:

adding a superabsorbent resin into a rubber emulsion with a solid content of 0.01-70% to obtain a resin-added rubber emulsion, and stirring the resin-added rubber emulsion for concentrating, and separating the superabsorbent resin from the resin-added rubber emulsion to obtain a concentrated latex after the concentrating.

Further, the rubber emulsion includes one selected from the group consisting of natural latex, concentrated natural latex, pre-vulcanized natural latex, epoxidized natural latex, deproteinized natural latex, skim latex, styrene-butadiene latex, carboxylated styrene-butadiene latex, acrylonitrile-butadiene latex, neoprene latex, butyl emulsion, polyisoprene latex, and mixtures thereof; or includes the waste latex produced by an acid, an inorganic salt or a polymer flocculant, and a bio-coagulated emulsion.

Further, the superabsorbent resin includes one selected from the group consisting of a synthetic polymer resin, a starch resin, a cellulose resin, and mixtures thereof.

Furthermore, the synthetic polymer resin is selected from one or more of polyacrylate resin, polyvinyl alcohol resin and polyoxyethylene resin.

superabsorbent resin herein is a hydrophilic group with structure of three-dimensional grid insoluble in water but swells to form a gel with excellent performance in water absorption and retention. When polyacrylate is added into rubber emulsion as superabsorbent resin, hydrophilic groups of polyacrylate are hydrated with water molecules in rubber emulsion, which makes the polymer grid to expand, resulting in different concentrations of mobile ions inside and outside the grid, osmotic pressure is generated therefore on both sides of the grid, and then water molecules in emulsion penetrate through the grid structure under osmotic pressure, where water absorption reaches a maximum and water molecules are no longer adsorbed.

Further, the mass fraction of the superabsorbent resin in the resin-added rubber emulsion is 0.1-10%, excessive content of superabsorbent resin in the latex solution will result in faster water removal from the rubber emulsion and rapid increase of emulsion viscosity, which is not conducive to the later separation of superabsorbent resin.

Further, the superabsorbent resin is a granular resin with a diameter of 50 μm to 0.5 cm, such that sufficient adsorption is ensured to facilitate separation.

Further, the stirring speed of the stirring is 200-500 r/min, a certain stirring speed is helpful to speed up the adsorption efficiency of superabsorbent resin while maintaining uniform viscosity of rubber emulsion, which is helpful to the subsequent separation of superabsorbent resin.

Further, the concentrating is a concentrating in a step-by-step manner or a concentrating in a one-step manner, and a duration for each step of concentrating is 4-8 h.

Theoretically, the greater the amount of superabsorbent resin added, the better the concentration effect, and the higher the solid content in the concentrated latex. However, the viscosity of the emulsion gradually rises as the solid content in the rubber emulsion increases, and the latex component in the concentrated emulsion will form a wrapping effect to the superabsorbent resin, which is detrimental to the subsequent separation. Therefore, it is preferred that the amount of superabsorbent resin added each time decreases when employing the multiple concentrations step-by-step, thereby facilitating the separation of the superabsorbent resin from the highly concentrated latex.

Additionally, prolonged concentration is not conducive for the following separation, because latex may still wrap the superabsorbent resin.

Further, the separating is carried out by filtration or centrifugation.

Another technical scheme of the disclosure provides the concentrated latex prepared by the method for concentrating rubber emulsion mentioned above.

Compared with the prior art, the disclosure has the following beneficial effects:

the method disclosed herein for concentrating rubber emulsion requires simple production equipment and consumes not much energy, and the prepared polymer emulsion has a solid content as high as 76%; superabsorbent resin adopted in this disclosure is reusable after drying, which therefore effectively reduces the production cost; natural latex concentrated by the method has rather high yields of dry rubber and little wastewater and the like; products prepared from the concentrated natural latex have excellent mechanical property, aging resistance and adhesive property; and the natural latex concentrating way does not require advance agglomeration, which reduces the production procedures and improves the production efficiency significantly.

DETAILED DESCRIPTION OF THE EMBODIMENTS

Various exemplary embodiments of the disclosure are now described in detail, which should not be considered a limitation of the disclosure, but rather as a more detailed description of certain aspects, features and embodiments of the disclosure.

It should be understood that the terms used in this disclosure are only for describing specific embodiments, and are not used to limit the disclosure. In addition, for the numerical range in the disclosure, it should be understood that each intermediate value between the upper limit and the lower limit of the range is also specifically disclosed. Any stated value or intermediate value within the stated range and any other stated value or every smaller range between intermediate values within the stated range are also included in the disclosure. The upper and lower limits of these smaller ranges may be independently included or excluded from the range.

Unless otherwise specified, all technical and scientific terms used herein have the same meaning as commonly understood by the ordinary technicians in the field of this disclosure. Although the disclosure only describes the preferred methods and materials, any methods and materials similar or equivalent to those described herein can also be used in the practice or testing of the disclosure. All documents mentioned in this specification are incorporated by reference to disclose and describe the methods and/or materials related to the documents. In case of conflict with any incorporated documents, the contents of this specification shall prevail.

Without departing from the scope or spirit of the disclosure, it is obvious to those skilled in the art that many modifications and changes can be made to the specific embodiments of the disclosure. Other embodiments obtained from the description of the disclosure will be obvious to those skilled in the art. The specification and embodiments of this application are exemplary only.

The words "including", "comprising", "having" and "containing" used in this application are all open terms, that is, they mean including but not limited to.

First Embodiment

A method for concentrating rubber emulsion includes the following specific steps:

adding superabsorbent resin (for example, sodium polyacrylate) into fresh natural latex with a solid content of 31% at a stirring speed of 250 r/min, the mass fraction of sodium polyacrylate in rubber emulsion is 3%; performing stirring for 8 hours, then filtering to remove the superabsorbent resin to prepare concentrated natural latex with a solid content of 63% (dry rubber content of 60.1%).

Second Embodiment

A method for concentrating rubber emulsion includes the following specific steps:

adding superabsorbent resin (for example, sodium polyacrylate) into fresh natural latex with a solid content of 31% at a stirring speed of 250 r/min, the mass fraction of sodium polyacrylate in rubber emulsion is 3%; performing stirring for 8 hours, and then filtering to remove the superabsorbent resin to prepare concentrated natural latex with a solid content of 63%; at the stirring speed of 250 r/min, again adding superabsorbent resin (sodium polyacrylate) into that prepared concentrated natural latex until the mass fraction in the rubber emulsion is 2.4%, performing stirring for 6 hours, and then filtering to remove the superabsorbent resin to prepare concentrated natural latex with a solid content of 69%; again under same stirring speed of 250 r/min, adding superabsorbent resin (sodium polyacrylate) for the third time into the concentrated natural latex prepared after the second filtration until the mass fraction in the rubber emulsion is 1.9%, performing stirring for 6 hours, and then filtering to remove the superabsorbent resin to prepare concentrated natural latex with a solid content of 75%; finally a concentrated natural latex with high solid content of 75% is obtained after three times of step-by-step concentration.

Third Embodiment

A new method for concentrating rubber emulsion includes the following specific steps:

adding superabsorbent resin (for example, sodium polyacrylate) into skim latex with a solid content of 8.85% (dry rubber content of 4.89%) at a stirring speed of 300 r/min, the mass fraction of sodium polyacrylate is 3%, performing stirring for 6 hours, then filtering to remove the superabsorbent resin to prepare concentrated skim latex with a solid content of 24.8% (dry rubber content of 21.75%).

Fourth Embodiment

A method for concentrating rubber emulsion includes the following specific steps:
adding superabsorbent resin (for example, sodium polyacrylate) into epoxidized natural latex with a solid content of 32% at a stirring speed of 300 r/min, the mass fraction of sodium polyacrylate in rubber emulsion is 3%; performing stirring for 8 hours, then filtering to remove the superabsorbent resin to prepare concentrated natural latex with a solid content of 37%; again adding superabsorbent resin (sodium polyacrylate) with mass fraction of 2.4% into that concentrated natural latex prepared after that previous filtering at a stirring speed of 250 r/min, performing stirring for 8 hours, then filtering to remove the superabsorbent resin to prepare concentrated epoxidized natural latex with a solid content of 42%; since a large number of surfactants affecting the concentration effect are introduced during the preparation of epoxidized natural latex, the solid content of the resulting concentrated epoxidized natural latex is rather low under the same experimental conditions.

Fifth Embodiment

A method for concentrating rubber emulsion includes the following specific steps:
adding superabsorbent resin (for example, sodium polyacrylate) into deproteinized natural latex with a solid content of 40% at a stirring speed of 300 r/min, the mass fraction of sodium polyacrylate in rubber emulsion is 3%, performing stirring for 8 hours, and then filtering to remove the superabsorbent resin to prepare concentrated deproteinized natural latex with a solid content of 46%; again adding superabsorbent resin (sodium polyacrylate) with mass fraction of 2.4% into that concentrated deproteinized natural latex prepared after that previous filtering at a stirring speed of 250 r/min, and performing stirring for 8 hours, then filtering to remove the superabsorbent resin to prepare concentrated deproteinized natural latex with a solid content of 52%; since a large number of surfactants affecting the concentration effect are introduced during the preparation of deproteinized natural latex, the solid content of the resulting concentrated deproteinized natural latex is rather low under the same experimental conditions.

Sixth Embodiment

A method for concentrating rubber emulsion includes the following specific steps:
adding superabsorbent resin (for example, sodium polyacrylate) into styrene-butadiene latex with a solid content of 28% at a stirring speed of 300 r/min, the mass fraction of sodium polyacrylate in rubber emulsion is 3.5%, performing stirring for 8 hours, and then filtering to remove the superabsorbent resin to prepare styrene-butadiene latex with a solid content of 50%; again adding superabsorbent resin (sodium polyacrylate) with mass fraction of 2.4% into that styrene-butadiene latex prepared after that previous filtering, performing stirring for 7 hours, and then filtering to remove the superabsorbent resin to prepare concentrated styrene-butadiene latex with a solid content of 63%.

Seventh Embodiment

A method for concentrating rubber emulsion includes the following specific steps:
adding superabsorbent resin (for example, sodium polyacrylate) into carboxylated styrene-butadiene latex with a solid content of 50% at a stirring speed of 300 r/min, the mass fraction of sodium polyacrylate in rubber emulsion is 3%, performing stirring for 6 hours, and then filtering to remove the superabsorbent resin to prepare carboxylated styrene-butadiene latex with a solid content of 58%; again adding superabsorbent resin (sodium polyacrylate) into that carboxylated styrene-butadiene latex prepared after that previous filtering, the mass fraction of sodium polyacrylate in carboxylated styrene-butadiene latex is 2.4%, performing stirring for 6 hours, and then filtering to remove the superabsorbent resin to prepare concentrated carboxylated styrene-butadiene latex with a solid content of 63%; adding superabsorbent resin (sodium polyacrylate) for the third time into that concentrated carboxylated styrene-butadiene latex prepared after second filtering, the mass fraction of sodium polyacrylate in rubber emulsion is 1.9%; performing stirring for 6 hours, and then filtering to remove the superabsorbent resin to prepare concentrated carboxylated styrene-butadiene latex; finally a concentrated carboxylated styrene-butadiene latex with high solid content of 67% is obtained after three times of step-by-step concentration.

Eighth Embodiment

A method for concentrating rubber emulsion includes that following specific steps:
adding superabsorbent resin (for example, sodium polyacrylate) into neoprene latex with a solid content of 50% at a stirring speed of 300 r/min, the mass fraction of sodium polyacrylate in rubber emulsion is 3%, performing stirring for 6 hours, and then filtering to remove the superabsorbent resin to prepare neoprene latex with a solid content of 57%; again adding superabsorbent resin (sodium polyacrylate) into that neoprene latex prepared after that previous filtering, the mass fraction of sodium polyacrylate in neoprene latex is 2.4%, performing stirring for 6 hours, and then filtering to remove the superabsorbent resin to prepare concentrated neoprene latex with a solid content of 62%; adding superabsorbent resin (sodium polyacrylate) for the third time into that concentrated neoprene latex prepared after second filtering, the mass fraction of sodium polyacrylate in rubber emulsion is 1.9%, performing stirring for 6 hours, and then filtering to remove the superabsorbent resin to prepare concentrated neoprene latex; finally a concentrated neoprene latex with high solid content of 66% is obtained after three times of step-by-step concentration.

Ninth Embodiment

A method for concentrating rubber emulsion includes the following specific steps:
adding superabsorbent resin (for example, sodium polyacrylate) into acrylonitrile-butadiene latex with a solid content of 44% at a stirring speed of 300 r/min, the mass fraction of sodium polyacrylate in rubber emulsion is 3%, performing stirring for 6 hours, then filtering to remove the superabsorbent resin to prepare acrylonitrile-butadiene latex with a solid content of 54%; again adding superabsorbent resin (sodium polyacrylate) into that acrylonitrile-butadiene latex prepared after that previous filtering, the mass fraction of sodium polyacrylate in acrylonitrile-butadiene latex is 2.4%, performing stirring for 6 hours, and then filtering to remove the superabsorbent resin to prepare concentrated acrylonitrile-butadiene latex with a solid content of 61%; adding superabsorbent resin (sodium polyacrylate) for the third time into that concentrated acrylonitrile-butadiene latex prepared after second filtering, the mass fraction of sodium polyacrylate in rubber emulsion is 1.9%, performing stirring for 6 hours, and then filtering to remove the superabsorbent resin to prepare concentrated acrylonitrile-butadiene latex; finally a concentrated acrylonitrile-butadiene latex with high solid content of 67% is obtained after three times of step-by-step concentration.

Tenth Embodiment

A method for concentrating rubber emulsion includes the following specific steps:
adding superabsorbent resin (for example, sodium polyacrylate) into polyisoprene latex with a solid content of 50% at a stirring speed of 300 r/min, the mass fraction of sodium polyacrylate in rubber emulsion is 3%, performing stirring for 6 hours, then filtering to remove the superabsorbent resin to prepare polyisoprene latex with a solid content of 60%; again adding superabsorbent resin (sodium polyacrylate) into that polyisoprene latex prepared after that previous filtering, the mass fraction of sodium polyacrylate in polyisoprene latex is 2.4%, performing stirring for 6 hours, and then filtering to remove the superabsorbent resin to prepare concentrated polyisoprene latex with a solid content of 68%; adding superabsorbent resin (sodium polyacrylate) for the third time into that concentrated polyisoprene latex prepared after second filtering, the mass fraction of sodium polyacrylate in rubber emulsion is 1.9%, performing stirring for 6 hours, and then filtering to remove the superabsorbent resin to prepare concentrated polyisoprene latex; finally a concentrated polyisoprene latex with high solid content of 76% is obtained after three times of step-by-step concentration.

Eleventh Embodiment

A concentration method of rubber emulsion, the specific steps are the same as those in the first embodiment, except for the specific parameters and experimental results in Table 1.

TABLE 1

Effect of the amount of superabsorbent resin on adsorption effect

| S/N | Stirring speed (r/min) | Rubber emulsion/ solid content | superabsorbent resin/mass fraction | Stirring duration | Solid content of concentrated latex | Latex coated with superabsorbent resin |
|---|---|---|---|---|---|---|
| 1 | 250 | Natural latex/31% | Sodium polyacrylate/ 10% | 2.5 h | 63% | Many |
| 2 | 250 | Natural latex/31% | Sodium polyacrylate/ 8% | 4 h | 63% | Many |
| 3 | 250 | Natural latex/31% | Sodium polyacrylate/ 5% | 6 h | 63% | Not much |
| 4 | 250 | Natural latex/31% | Sodium polyacrylate/ 3% | 8 h | 63% | None |
| 5 | 250 | Natural latex/31% | Sodium polyacrylate/ 1% | 16 h | 63% | None |
| 6 | 250 | Natural latex/31% | Sodium polyacrylate/ 0.1% | 48 h | 63% | None |

As concluded from the data in Table 1, for reaching the same solid content, duration for concentration is decreased progressively as the amount of superabsorbent resin (sodium polyacrylate) is increased; however, as the amount of resin is increased, the situation of superabsorbent resin being coated by latex gradually becomes serious. The wrapping of latex by superabsorbent resin (none, not much, many) is used to exemplify the amount of latex loss, whether it is easy to separate, and whether it is easy to recycle; specifically, the more latex coated with superabsorbent resin, the greater the loss; the larger the amount of wrapping, the difficult to separate the superabsorbent resin and the less conducive to recycling. Considering the time cost, latex loss and recycling situation, it is determined that the dosage of sodium polyacrylate is 3%.

Twelfth Embodiment

A method for concentrating rubber emulsion, which is the same as that in the first embodiment, except for the parameters and the experimental results shown in Table 2.

TABLE 2

Influence of different kinds of superabsorbent resin on adsorption effect

| S/N | Type/mass fraction of superabsorbent resin | Stirring speed r/min | Rubber emulsion/ solid content | Stirring duration | Solid content of concentrated latex |
|---|---|---|---|---|---|
| 1 | Sodium polyacrylate resin/3% | 250 | Natural latex/31% | 3 h | 63% |
| 2 | Polyvinyl alcohol resin/3% | 250 | Natural latex/31% | 10 h | 63% |
| 3 | Polyoxyethylene resin/3% | 250 | Natural latex/31% | 9 h | 63% |
| 4 | Starch resin/3% | 250 | Natural latex/31% | 12 h | 63% |
| 5 | Acrylonitrile cellulose resin/3% | 250 | Natural latex/31% | 11 h | 63% |

The data in Table 2 shows that under the same experimental conditions, the duration required to concentrate the latex to the same solid content is the shortest when the superabsorbent resin is sodium polyacrylate.

Thirteenth Embodiment

A method for concentrating rubber emulsion, which is the same as that in the second embodiment, except for the parameters and the experimental results shown in Table 3.

TABLE 3

Adsorption effect of different amount of superabsorbent resin on step by step concentration

| S/N | Rubber emulsion/ solid content | super- absorbent resin in 1$^{st}$ adsorption/ mass fraction | super- absorbent resin in 2$^{st}$ adsorption/ mass fraction | super- absorbent resin in 3$^{st}$ adsorption/ mass fraction | Solid content of concen- trated latex | Latex coated with super- absorb- ent resin |
|---|---|---|---|---|---|---|
| 1 | Natural latex/31% | 3% | 3% | 3% | 75% | Not much |
| 2 | Natural latex/31% | 3% | 5% | 10% | 75% | Many |
| 3 | Natural latex/31% | 3% | 2.4% | 1.9% | 75% | None |

It can be concluded from the data in Table 3 that in the process of step-by-step concentration, it is not easy for the superabsorbent resin to be wrapped by the latex if the amount of superabsorbent resin is gradually reduced, which is not only beneficial to the separation of resin from the latex and reducing the loss of latex, but also ensures the recycling of superabsorbent resin.

What has been described above are only the preferred embodiments of the disclosure, and it is not intended to limit the disclosure. Any modification, equivalent replacement and improvement within the spirit and principle of the disclosure should be included in the scope of protection of the disclosure.

What is claimed is:

1. A method for concentrating rubber emulsion, comprising:

adding a superabsorbent resin into a rubber emulsion with a solid content of 0.01-70% to obtain a resin-added rubber emulsion, and stirring the resin-added rubber emulsion for concentrating; and obtaining a concentrated latex by separating the superabsorbent resin from the resin-added rubber emulsion after the concentrating;

wherein the superabsorbent resin comprises a sodium polyacrylate superabsorbent resin.

2. The method for concentrating rubber emulsion according to claim 1, wherein the rubber emulsion comprises one selected from the group consisting of a natural latex, a concentrated natural latex, a pre-vulcanized natural latex, an epoxidized natural latex, a deproteinized natural latex, a skim latex, a styrene-butadiene latex, a carboxylated styrene-butadiene latex, an acrylonitrile-butadiene latex, a neoprene latex, a butyl emulsion, a polyisoprene latex, and mixtures thereof; or the rubber emulsion comprises a waste latex produced by an acid, one of an inorganic salt and a polymer flocculant, and a bio-coagulated emulsion.

3. The method for concentrating rubber emulsion according to claim 1, wherein a mass fraction of the superabsorbent resin in the resin-added rubber emulsion is in a range from 0.1% to 10%.

4. The method for concentrating rubber emulsion according to claim 1, wherein the superabsorbent resin is a granular resin with a diameter in a range from 50 micrometers (μm) to 0.5 centimeters (cm).

5. The method for concentrating rubber emulsion according to claim 1, wherein a stirring speed of the stirring is in a range from 200 radians per minute (r/min) to 500 r/min.

6. The method for concentrating rubber emulsion according to claim 1, wherein the concentrating is a concentrating in a step-by-step manner or a concentrating in a one-step manner, and a duration for each step of concentrating is in a range from 4 hours (h) to 8 h.

7. The method for concentrating rubber emulsion according to claim 1, wherein the separating is carried out by filtration or centrifugation.

\* \* \* \* \*